United States Patent [19]

Divin et al.

[11] 4,287,418

[45] Sep. 1, 1981

[54] METHOD FOR MEASURING THE SPECTRAL DISTRIBUTION OF ELECTROMAGNETIC RADIATION INTENSITY AND SPECTROMETER OF MILLIMETRIC AND FAR-INFRARED RANGES FOR EFFECTING SAME

[76] Inventors: Jury Y. Divin, ulitsa Narodnogo Opolchenia, 54, kv. 100; Oleg J. Polyansky, ulitsa Malaya Gruzinskaya, 46, kv. 10; Alexandr Y. Shulman, ulitsa Dubninskaya, 12, korpus 3, kv. 96, all of Moscow, U.S.S.R.

[21] Appl. No.: 52,688

[22] Filed: Jun. 27, 1979

[30] Foreign Application Priority Data

Jul. 6, 1978 [SU] U.S.S.R. .............................. 2639129
Jul. 6, 1978 [SU] U.S.S.R. .............................. 2639130

[51] Int. Cl.$^3$ .............................................. G01J 1/00
[52] U.S. Cl. .................................... 250/336; 250/338
[58] Field of Search ................ 250/336, 338; 364/485, 364/498, 725, 826

[56] References Cited

U.S. PATENT DOCUMENTS

| 3,124,745 | 3/1964 | Schroeder | 364/485 |
| 3,466,431 | 9/1969 | Fuchs et al. | 364/485 |
| 3,800,131 | 3/1974 | White | 364/826 |
| 4,093,989 | 6/1978 | Flink et al. | 364/485 |

OTHER PUBLICATIONS

Belenov, E. M. et al., "Data Transmission in the Far Infrared Range", Sov. J. Quantum Electron, 9(11) Nov. 1979, 1478-1479.

Primary Examiner—Alfred E. Smith
Assistant Examiner—Janice A. Howell
Attorney, Agent, or Firm—Burgess, Ryan and Wayne

[57] ABSTRACT

A method for measuring the spectral distribution of electromagnetic radiation intensity, wherein the spectral distribution of electromagnetic radiation intensity is converted to an electric signal by means of a direct integral Hilbert transform in superconducting weak links. The electric signal as a function of a direct integral Hilbert transform parameter is measured, and the desired spectral distribution of electromagnetic radiation intensity is determined by applying an inverse integral Hilbert transform to the measured function. A spectrometer of millimeter and far-infrared ranges for effecting the above method is provided for determining the frequency spectrum of microwave or infrared radiation signals. The radiation to be measured is modulated, with the modulated signal coupled to a receiver to which a variable scanning voltage is applied by a control unit, the value of the scanning voltage being proportional to a Hilbert transform parameter. The output of the receiver is coupled to a phase detector, to which a reference signal is applied from the modulator; the output of the phase detector is a direct Hilbert transform of the spectral distribution of the input signal (when the Hilbert transform parameter-representing voltage applied to the receiver is scanned through the entire frequency range of the input signal). The spectral distribution is then obtained by deriving the inverse integral Hilbert transform of the output of the phase detector.

9 Claims, 9 Drawing Figures

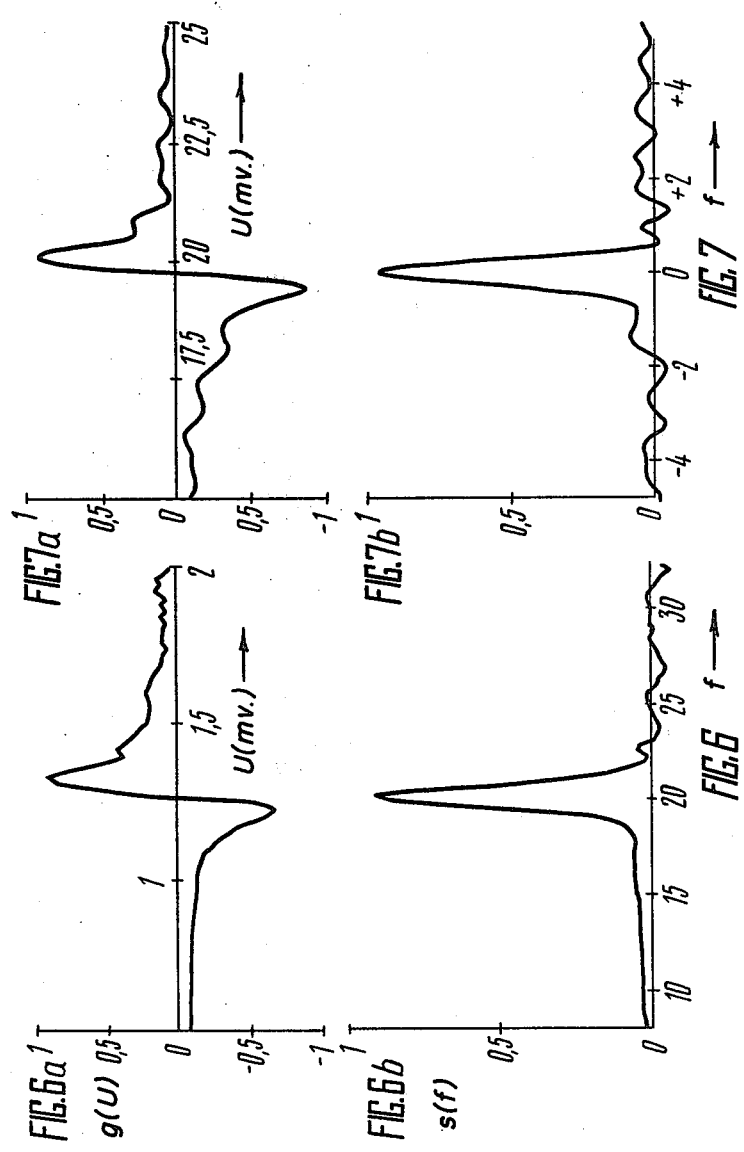

METHOD FOR MEASURING THE SPECTRAL DISTRIBUTION OF ELECTROMAGNETIC RADIATION INTENSITY AND SPECTROMETER OF MILLIMETRIC AND FAR-INFRARED RANGES FOR EFFECTING SAME

FIELD OF THE INVENTION

The present invention relates to measurements of the spectral distribution of electromagnetic radiation intensity, and more particularly to methods for measuring the spectral distribution of electromagnetic radiation intensity and to spectrometers of millimeter and far-infrared ranges for effecting same.

The invention is applicable in all fields of science and technology involving investigations of emission and absorption spectra in the millimeter and far-infrared ranges: in semiconductor physics and engineering, in the investigations of plasma (both cold, e.g. atmospheric plasma, and hot thermonuclear plasma, e.g. in Tokamak-type installations, in astrophysics, in terrestrial surface studies, in investigations of absorption spectra by magnetic resonance methods, in analytical chemistry, in process monitoring, in chemical production, and others.

BACKGROUND OF THE INVENTION

Spectral measurements play an important role in scientific research and technological applications for they afford information on the composition of matter under investigation and on the processes occurring therein on the molecular level. The wavelength region including the millimeter and far-infrared ranges is transitional between the radio-frequency and optical ranges and still remains most difficult for spectroscopic studies. This region has been handled by optical methods (diffraction and interference spectroscopy) as well as methods developed for the microwave range (mixing of the radiation of interest with that produced by a local oscillator based on a nonlinear element and measurement of the resulting signal at a lower intermediate frequency). Various spectral methods are comparable with respect to such basic parameters as the attainable spectral resolution, range of scanned frequencies, etc. The former two methods involve the use of grating and Fourier spectrometers which operate in the short-wave part of the range under investigation (at wave lengths shorter than 1 mm), permit continuous scanning of the spectrum (with interchanging of the optical components: gratings, beam splitters and others), provide for a resolution of 0.5 to 0.1 cm$^{-1}$ (up to 0.05 cm$^{-1}$ in the case of best laboratory models of Fourier spectrometers as opposed to commercially produced spectrometers), and are characterized by dimensions much greater than the wavelength of the radiation of interest (the higher the resolution, the greater the dimensions). Spectrometers using the principle of mixing the radiation of interest with that produced by a harmonic oscillator or a laser operate in the long-wave part of the range under investigation (longer than 1mm), provide for a resolution of up to 10$^{-5}$ cm$^{-1}$, but are not suitable for continuous scanning of spectra in a broad frequency range. Thus, the existing methods for spectral measurements in the millimeter and far-infrared ranges fail to provide means for continuous scanning of the spectrum in the entire region of interest with a sufficiently high resolution. Attempts to solve this problem using known methods invariably lead to serious complexity of the measuring procedure and instrumentation. The most advantageous method among the above methods of spectral studies in the millimeter and far-infrared ranges are offered by Fourier spectroscopy which has so far gained the widest acceptance.

Known in the art is a method for measuring the spectral distribution of electromagnetic radiation intensity (cf. "Spectroscopic Techniques for Far-Infrared, Submillimeter and Millimeter Waves", ed. D. H. Martin, North-Holland Publ. Co., 1967, Ch. 2. by converting the spectral distribution of electromagnetic radiation intensity to an electric signal using a direct integral transform, measuring the electric signal as a function of a direct integral transform parameter, and determining the desired spectral distribution of electromagnetic radiation intensity by applying an inverse integral transform to the measured function. In this method, the integral transform is a Fourier transform, the direct integral transform used in converting the spectral distribution of electromagnetic radiation intensity to an electric signal being based on the interference phenomenon with subsequent conversion of the power of the radiation under investigation to an electric signal, and the direct integral transform parameter is the optical path difference.

Due to the interference phenomenon the electric signal $\Delta I$ depends on the path difference of rays $\chi$ and is correlated with the spectral density $S(f)$ of the radiation being investigated by the integral Fourier transform according to the formula:

$$\Delta I(x) = \tfrac{1}{2} \cdot \Delta I(o) + \int_0^\infty S(f) \cdot \cos(2\pi f x) df, \qquad (1)$$

wherein $\Delta I(o)$ is the signal at x=o, f is the radiation frequency, cm$^{-1}$. In order to find a sought function $S(f)$ to the measured dependence, use is made of the inverse Fourier transformation according to the formula:

$$S(f) = 4 \int_0^\infty /\Delta I(x) - \tfrac{1}{2}\Delta I(o)/\cos(2\pi f x) dx \qquad (2)$$

(See, for instance, Spectroscopic Techniques, Ed. D. H. Martin, North Holland Publ. Co.-Amsterdam, 1967, Ch. 2, Sec. 2).

Also known is a spectrometer of millimeter and far-infrared ranges (cf. ibid.) for carrying out the above method, comprising the following components arranged in series along the electromagnetic radiation path: an electromagnetic radiation modulator and a unit for converting the spectral distribution of electromagnetic radiation intensity to an electric signal by means of a direct integral transform, a phase-sensitive detection unit whose one input is electrically associated with the output of the converting unit and whose other input is electrically associated with the modulator, a unit for applying an inverse integral transform to the electric signal measured as a function of a direct integral transform parameter, electrically associated with the phase-sensitive detection unit, and a control unit associated with the converting unit and electrically coupled to the input of the unit for applying an inverse integral transform to the measured function. In this spectrometer, the unit for converting the spectral distribution of electromagnetic radiation intensity to an electric signal by means of a direct integral transform comprises an interferometer optically associated with a broad-band radiation detector producing an electric signal varying directly with the power of the radiation passing through the interferometer, and the optical path difference is controlled in the interferometer by means of the control unit, by mechanical displacement of a movable mirror in the interferometer.

In the present spectrometer a unit for applying an inverse integral transform of the measured dependence of an electric signal on the direct integral transform parameter comprises a universal-type or a specialized computer for calculating the inverse Fourier transform according to Formula (2) as well as for collecting and processing data and displaying results (of R. J. Bell, Introductory Fourier Transform Spectroscopy, Acad. Press, No. 4, 1972, Ch. 18 (Introduction and Summary), Ch. 19 (Introduction and Summary), and publicity booklets of the companies manufacturing the Fourier spectrometers, for instance, Bruker-Physik AG.

However, the best resolution attainable by the above method and spectrometer is determined by the maximum path difference in the interferometer and a resolution of, for example, 0.001 cm$^{-1}$ requires a path difference of 10 m, which is practically impossible to achieve because of the difficulties in designing the mechanical system for changing the path difference in the interferometer.

Besides, the prior art method and spectrometer necessitate, to obtain a maximum resolution, a precision path difference control system with an accuracy of better than 0.1 of the shortest wavelength in the spectrum under investigation, which complicates both the spectrometer and its operation and makes it difficult to attain high spectrum scanning speeds.

Moreover, the maximum resolution attainable by the prior art method and spectrometer is determined by the highest measured Fourier coefficient, which imposes more stringent requirements on the dynamic range of the broad-band radiation detector and synchronous detection unit because of the wide difference in the electric signal in different portions of the interference pattern.

SUMMARY OF THE INVENTION

It is an object of the present invention to provide a method for measuring the spectral distribution of electromagnetic radiation intensity, ensuring high resolution during measurement.

Another object of this invention is to provide a spectrometer of millimeter and far-infrared ranges, ensuring high resolution during measurement.

Still another object of the invention is to extend the operating range of continuous measurement of the spectral distribution of electromagnetic radiation intensity.

Yet another object of the invention is to simplify the spectral distribution measurement procedure.

A further object of the invention is to cut down the spectral distribution measurement time.

Another object of the invention is to simplify the design of the spectrometer.

These objects are attained, in a method for measuring the spectral distribution of electromagnetic radiation intensity by converting the spectral distribution of electromagnetic radiation intensity to an electric signal by means of a direct integral transform, measuring the electric signal as a function of a direct integral transform parameter and determining the desired spectral distribution of electromagnetic radiation intensity by applying an inverse integral transform to the measured relationship. According to the invention, the direct and inverse integral transforms are essentially direct and inverse integral Hilbert transforms, the direct integral Hilbert transform being based on an a.c. Josephson effect in superconducting weak links, in which the intrinsic Josephson generation line width is less than the value corresponding to the required resolution, on the voltage exactness and stability which ensures the necessary accuracy of measuring the frequency of the electromagnetic radiation under investigation and resolution and from the electric signal as a function of the direct integral Hilbert transform parameter is derived.

It is preferable that selected as the direct integral Hilbert transform parameter should be voltage U across the superconducting weak links, which is varied from zero to a value exceeding $0.062 f_1$ [mV], where $f_1$ [cm$^{-1}$] is the maximum frequency in the range under investigation, so that the electric signal-to-noise ratio diminishes to unity.

It is also preferable that, in the case of measurement of the spectral distribution of the intensity of electromagnetic radiation in the form of a narrow spectral emission or absorption band adjustable within a limited frequency range by a value much greater than the width of the spectral emission or absorption band without affecting its shape and intensity, selected as the direct integral Hilbert transform parameter should be center frequency $f_2$ of the spectral emission or absorption band, which is then scanned from low to high frequencies, the constant voltage across the superconducting weak links being set equal to $0.062 f_3$ [mV], where $f_3$ [cm$^{-1}$] is the midpoint of said limited frequency range.

The objects of the invention are also attained, in a spectrometer of millimeter and far-infrared ranges for effecting the proposed method comprising the following components arranged in series along the path of the electromagnetic radiation under investigation: an electromagnetic radiation modulator and a unit for converting the spectral distribution of electromagnetic radiation intensity to an electric signal by means of a direct integral transform, a phase sensitive detection unit having one input which is electrically associated with the output of the unit for converting the spectral distribution of electromagnetic radiation intensity to an electric signal by means of a direct integral transform and another input is electrically associated with the electromagnetic radiation modulator, a unit for applying an inverse integral transform to the electric signal measured as a function of a direct integral transform parameter, and a control unit associated with the unit for converting the spectral distribution of electromagnetic radiation intensity to an electric signal by means of a direct integral transform and electrically associated with the input of the unit for applying an inverse integral transform to the electric signal measured as a function of direct integral transform parameter, according to the invention, the unit for converting the spectral distribution of electromagnetic radiation intensity to an electric signal by means of a direct integral transform is essentially an electromagnetic radiation receiver based on superconducting weak links, whose resistance R [ohms] and operating temperature T (°K.) are selected to meet condition RT $<740\Delta f$, where $\Delta f$ [cm$^{-1}$] is the required resolution, and the unit for applying an inverse integral transform to the electric signal measured as a function of a direct integral transform parameter is essentially a unit for applying a direct integral Hilbert transform to the electric signal measured as a function of a direct integral Hilbert transform parameter.

The spectrometer should preferably comprise a multiplier unit whose input is connected to the phase-sensitive detection unit and whose output is connected to the input of the unit for applying an inverse integral Hilbert transform to the electric signal measured as a function of a direct integral Hilbert transform parameter, the control unit being essentially a source of an adjustable voltage, connected whereto is another input of the multiplier unit.

The spectrometer should also comprise a source of electromagnetic radiation to be investigated which is incident upon the electromagnetic radiation modulator, and a center frequency scanning unit whose input is connected to the control unit and whose output is connected to the input of the electromagnetic radiation source.

It is preferable that, in the case of adjustable emission band measurements, the electromagnetic radiation source be essentially a source of narrow-band adjustable electromagnetic radiation.

It is advisable that, in the case of adjustable absorption band measurements, the electromagnetic radiation source include a source of broad-band electromagnetic radiation and an absorption cell with a narrow adjustable absorption band to be investigated, said absorption cell being arranged upstream of the electromagnetic radiation modulator along the electromagnetic radiation path, the output of the center frequency scanning unit being connected to the input of the absorption cell.

The present invention makes use of the resonance properties of an a.c. Josephson effect occurring during interaction of electromagnetic radiation with the superconducting weak links, which permits attaining a resolution of up to $0.001$ cm$^{-1}$.

In addition, the present invention makes use of the independence of the attainable resolution from the geometrical dimensions of the spectrometer, which enables continuous spectral measurements to be made in the entire range from micro- to infrared waves.

The invention also provides for electronic scanning of the spectrum, which permits using it in high-speed spectroscopy.

An additional advantage of the invention is the possibility of determining the shape of readjusted spectral absorption bands by making use of the resonance properties of an a.c. Josephson effect.

Finally, the invention provides for combining, in the same small-size solid-state device, a dispersing element with a detecting one, thereby eliminating the inherently complex optico-mechanical part and simplifying both the spectrometer design and the measuring procedure.

BRIEF DESCRIPTION OF THE DRAWINGS

Other objects and advantages of the invention will become more apparent from the following detailed description of specific embodiments thereof, taken in conjunction with the accompanying drawings, wherein:

FIG. 6a is a graph showing function g(U) sensed by the unit for applying an inverse integral Hilbert transform in measuring the slit function of a grating monochromator (T=4.2 [K]; R=26 [ohms]) by the spectrometer of FIG. 2, according to the invention;

FIG. 6b is a graph showing the measured spectral distribution S(f) of the intensity of the electromagnetic radiation produced by a grating monochromator, the resolution of the spectrometer of FIG. 2 being $\Delta f \approx 0.15$ [cm$^{-1}$], according to the invention;

FIG. 7a is a graph showing function I(U$_o$, f$_2$) sensed by the unit for applying an inverse integral Hilbert transform in measuring the instrumental function of a grating monochromator (voltage U$_o$ across the receiver is 1.23 mV; T=4.2 K; R=8 ohms) by the spectrometer of FIG. 4, according to the invention;

FIG. 7b is a graph showing the measured spectral distribution S(f−f$_3$) of the intensity of the electromagnetic radiation at the utput of a grating monochromator tuned to frequency f$_3 \approx 20$ [cm$^{-1}$], the resolution of the spectrometer of FIG. 4 being $\Delta f \approx 0.05$ [cm$^{-1}$], according to the invention.

DETAILED DESCRIPTION OF THE INVENTION

Figure 1:
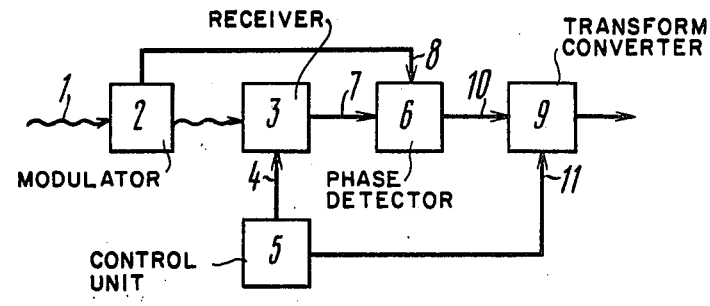
FIG. 1 is a schematic of a spectrometer of millimeter and far-infrared ranges for carrying out the method for measuring the spectral distribution of electromagnetic radiation intensity, according to the invention.

The proposed method for measuring the spectral distribution of electromagnetic radiation intensity consists in that, by making use of an a.c. Josephson effect in superconducting weak links wherein the intrinsic Josephson generation line width is less than the value corresponding to the required resolution, on which the voltage exactness and stability ensure the necessary accuracy of measuring the frequency of the electromagnetic radiation under investigation and resolution, the spectral distribution of electromagnetic radiation intensity is converted to an electric signal by means of a direct integral Hilbert transform in superconducting weak links. Then, the electric signal as a function of a direct integral Hilbert transform parameter is measured, and the desired spectral distribution of electromagnetic radiation intensity is determined by applying an inverse integral Hilbert transform to the measured function.

In order to derive the formula underlying the claimed method, let us examine the well known expression for an electric signal generated on superconducting weak links irradiated with monochromatic radiation having a frequency f. Without considering intrinsic noise in superconducting weak links, we have:

$$\Delta I(u,f) = \frac{\overline{\tau_1^2(f)}}{4I(u^2 - f^2)}, \quad (3)$$

wherein $\overline{\tau^2}_{1(f)}$ is the period-average square of current induced by radiation in superconducting weak links, I is direct current, and U is the constant voltage in superconducting weak links in arbitrary units (cf. H. Kanter, F. L. Vernon, Jr., J. Appl. Physics, vol. 43 p. 317403183 (1972), Eq. (8)).

If incident radiation is distributed all over the frequency spectrum at a spectral density S(f), then after some simple transformations we obtain with the same approximations as those with which the Formula (3) was derived:

$$\Delta I(U) = \frac{\overline{11}}{8IU} \left(\frac{1}{\overline{11}}\right) \cdot \int_{-\infty}^{\infty} \frac{\tau_1^2(f)}{f - U} \cdot df. \quad (4)$$

wherein an integral is taken in its main meaning after Cochy, $\tau_1^2(f) = S(f)/K(F)/u^2 K(f)$ is the transfer function of an antenna formed by the wire electrodes of superconducting weak links.

It follows from Eq. (4) that the experimentally measured function $$g(U) = \frac{8}{\overline{11}} I. U. \Delta I(U) \quad (5)$$

is correlated with $\tau_1^2$ (f) by a direct integral Hilbert transform. In order to find the sought function S(f), an inverse Hilbert transform should be applied to the measured dependence g(U) according to the formula:

$$\tau_1^2(f) = \frac{1}{\overline{11}} \int_{-\infty}^{\infty} \frac{g(U)}{U - f} dU \quad (6)$$

whereby the sought value S(f) is found (with an accuracy of up to /K(f)/2).

In the case where measurement is made of the intensity of electromagnetic radiation with a arbitrary spectral distribution, selected as the direct integral Hilbert transform parameter is voltage U across the superconducting weak links, which is varied from zero to a value exceeding $0.062f_1$ [mV], where $f_1$ [cm$^{-1}$] is the maximum frequency in the spectrum under investigation, so that the electric signal-to-noise ratio diminishes to unity.

In the case where measurement is made of the spectral distribution of the intensity of electromagnetic radiation in the form of a narrow spectral emission or absorption band adjustable within a limited frequency range by a value much greater than the width of said spectral emission or absorption band without affecting its shape and intensity, selected as the direct integral Hilbert transform parameter is center frequency $f_2$ which is scanned from low to high frequencies, the constant voltage across the superconducting weak links being set equal to $0.062f_3$ [mV], where $f_3$ [cm$^{-1}$] is the midpoint of said frequency range.

As an example, consider now a spectrometer of millimeter and far-infrared ranges for effecting the above method.

The spectrometer of millimeter and far-infrared ranges comprises the following components arranged in series along the path of the electromagnetic radiation 1 under investigation (conventionally shown as a wavy line in FIG. 1); an electromagnetic radiation modulator 2 and an electromagnetic radiation receiver 3 based on superconducting weak links, whose resistance R [ohms] and operating temperature T [K] are selected to meet condition RT<740 Δf, where Δf is the required resolution. The receiver 3 has an input 4 connected to a control unit 5. Connected to the output of the receiver 3 is a phase-sensitive detection unit 6 by its unit 7, the other input 8 whereof is connected to the modulator 2. The output of the unit 6 is connected to a unit 9 for applying an inverse integral Hilbert transform to the electric signal measured as a function of a direct integral Hilbert transform parameter, namely to its input 10, while the other input 11 of the unit 9 is connected to the control unit 5. The output of the unit 9 serves as the output of the spectrometer.

The construction of the receiver 3 is similar to those of conventional detectors based on superconducting weak links for the far-infrared range. The structure and parameters of such a receiver of electromagnetic radiation are well known in the art and described at length in the following publications:

1. C. C. Grimes, et al., J. Appl. Phys., Vol. 29, N 8, July 1968, p.p. 3905–3912
2. H. Kanter and Vernon F. L., J. Appl. Phys., Vol. 43, N 7, July 1972, p.p. 3174–3183
3. H. Tolner, J. Appl. Phys., Vol. 48, N 2, February 1977, p.p. 691–701
4. Yu. Ya. Divin and Nad' F. Ya., Radiotechnika i Electronica, Vol. 18, N 4, 1973, p.p. 879–882 (in Russian)
5. Yu. Ya. Divin, et al., Radiotechnika i Electronica, Vol. 21, N 8, 1976, p.p. 1703–1706 (in Russian)
6. Yu. Ya. Divin, et al., Radiotechnika i Electronica, Vol. 23, N 9, 1978, p.p. 1875–1881 (in Russian)

Structurally, such a receiver comprises a cryostat with a system based on superconducting weak links (i.e. a Josephson junction, a superconducting point contact and a superconducting bridge). The cryostat is provided with an optical input for supply of radiation to superconducting weak links (a light guide with a taper or a port with a mirror) as well as with an electrical input for defining (imposing) the shift, and with an electrical output for providing a detection signal generated in superconducting weak links under the effect of radiation.

The structure for employment of the inverse Hilbert transform in our case is quite similar to that utilized for the inverse Fourier transform in the conventional Fourier spectroscopic method which is used for measurements of the spectral distribution of electromagnetic radiation intensity in the far-infrared range. Se P. L. Richards, "Fourier Transform Spectroscopy" in: "Spectroscopic Techniques", ed. D. H. Martin, North-Holland Publ. Co., Amsterdam, 1967, Ch. 2.

The Fourier spectroscopic method is based on detecting radiation passed through an interferometer, measuring the dependence of a detector signal on the difference of the paths of rays in the interferometer, and applying the inverse Fourier transform for measuring the dependence thus-established using either an analogue scheme or a computer. See R. J. Bell, "Introductory Fourier Transform Spectroscopy," Acad. Press, N.Y., 1972, Ch. 18, 19.

The accuracy of the inverse Fourier transform performed by a computer is considerably higher than that obtainable with analogue schemes, and, therefore, the modern Fourier spectrometers make use of built-in high-speed computers for performing the inverse Fourier transform.

The unit 9 for effecting the inverse Hilbert transform in the claimed spectrometer can be similarly made either in the form of an analogue scheme (see U.S. Pat. No. 3,800,131) or in the form of a computer as is the case of the Fourier spectrometers.

Figure 2:
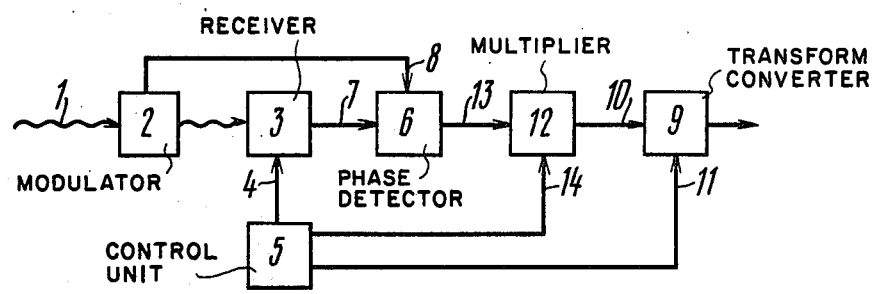
FIG. 2 is a schematic of an embodiment of the spectrometer of millimeter and far-infrared ranges for the case where it is intended to measure electromagnetic radiation with a arbitrary spectral distribution of its intensity, according to the invention.

In the case where the spectrometer of millimeter and far-infrared ranges is intended for measuring the electric radiation 1 with an arbitrary spectral distribution of its intensity, the control unit 5 (FIG. 2) is essentially a source of an adjustable voltage, and a multiplier unit 12 is introduced with its input 13 connected to the output of the unit 6 and its output connected to the input 10 of the unit 9.

Figure 3:
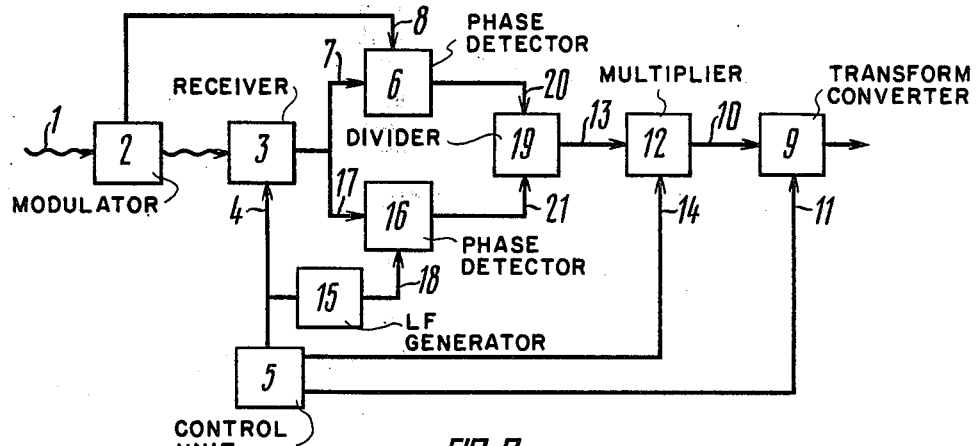
FIG. 3 is a schematic of another embodiment of the spectrometer of millimeter and far-infrared ranges for the case where the differential resistance of the adjustable voltage source is much greater than the resistance of the receiver built upon superconducting weak links, according to the invention.

In the case where the internal impedance of the adjustable voltage source 5 is much greater than the impedance of the electromagnetic radiation receiver 3 based on superconducting weak links, the spectrometer of millimeter and far-infrared regions additionally comprises a low-frequency generator 15 (FIG. 3) connected to the input 4 of the receiver 3 and a phase-sensitive detection unit 16 whose input 17 is connected to the input 7 of the unit 6. The other input 18 of the unit 16 is connected to the generator 15. A divider unit 19 is also introduced with its input 20 connected to the output of the unit 6, its input 21 connected to the unit 16, and its output connected to the input 13 of the multiplier unit 12.

Figure 4:
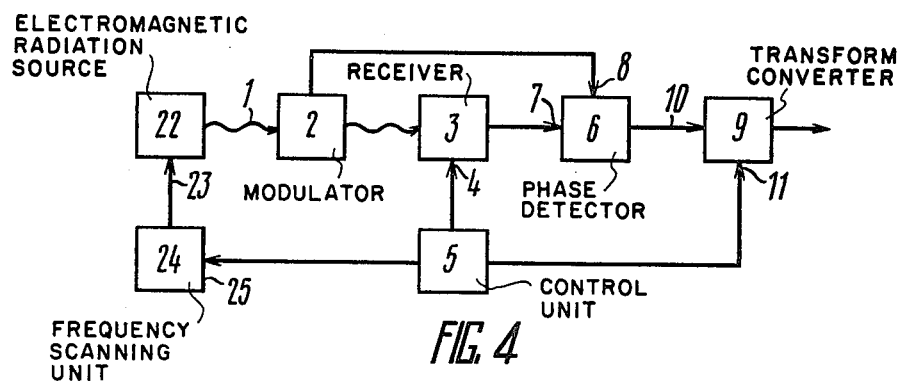
FIG. 4 is a schematic of still another embodiment of the spectrometer of millimeter and far-infrared ranges for the case where it is intended to measure the spectral distribution of the intensity of electromagnetic radiation in the form of an adjustable narrow spectral emission band, according to the invention.

In the case where the spectrometer of millimeter and far infrared ranges is intended for measuring the spectral distribution of the intensity of electromagnetic radiation in the form of a narrow spectral emission or absorption band adjustable within a limited frequency range by a value much greater than the width of the emission or absorption band without affecting its shape and intensity, it additionally comprises a source 22 (FIG. 4) of the electromagnetic radiation 1 (FIG. 1) under investigation. Connected to an input 23 (FIG. 4) of the source 22 is a center frequency scanning unit 24 whose input 25 is coupled to the unit 5.

In the case where the spectrometer is intended to determine the shape of the narrow spectral emission band, the source 22 is essentially a source of narrow-band adjustable electromagnetic radiation.

Figure 5:
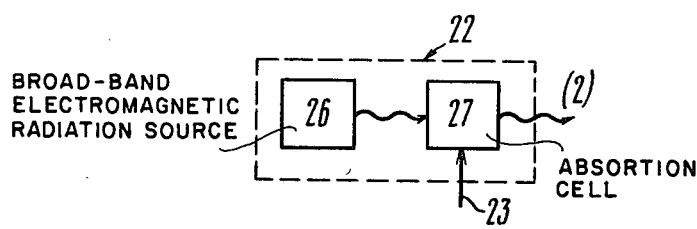
FIG. 5 is a schematic of the radiation source in the case where the spectrometer of millimeter and far-infrared ranges is intended to determine the shape of the adjustable narrow spectral absorption band, according to the invention.

In the case where the spectrometer is intended to determine the shape of the narrow spectral absorption band, the source 22 (FIG. 5) includes a source 26 of broad-band electromagnetic radiation and an absorption cell 27 with a narrow adjustable absorption band to be investigated, arranged upstream of the modulator 2 along the electromagnetic radiation path.

The proposed spectrometer of millimeter and far-infrared ranges for effecting the method of the present invention operates as follows.

The radiation 1 (FIG. 1) of interest, modulated by the modulator 2, is incident upon the receiver 3 based on superconducting weak links. The modulated radiation initiates an electric signal at the output of the reciver 3, variable at the modulation frequency. This signal is applied to the input 7 of the phase-sensitive detection unit 6 in which it is detected. The reference electric signal necessary for the detection is applied to the input 8 of the unit 6 from the modulator 2. The detected signal at the output of the unit 6 varies directly with ΔI of the current through the receiver 3 under the effect of the radiation 1 at a given value of the voltage U applied from the control unit 5 to the input 4 of the receiver 3. This current variation relates to the spectral distribution $S(f)$ of the intensity of the electromagnetic radiation 1 as (as measured in units, c.f. Equation (4) above):

$$\Delta I(U) \sim \frac{1}{UI(U)} \left( -\frac{1}{\pi} \right) \int_{-\infty}^{+\infty} \frac{S(f) K(f)^2}{0.062 f - U} df, \quad (7)$$

where the integral is to be understood in terms of the Cauchy principal value, $I(U)$ is the current through the receiver 3 at a given magnitude of the voltage U across the receiver 3, $K(f)$ is the transfer function of the antenna (not shown) of the receiver 3, relating the current induced in the receiver 3 by the radiation 1 (FIG. 1) with frequency f to the amplitude of the electric field in the electromagnetic wave of the radiation 1 under investigation. Factor 0.062 preceding frequency f is the value, calculated to the fourth decimal place, of dimensional quantity 2e/hc relating the magnitude of the voltage U in mV to the value of frequency f in $cm^{-1}$. In this coefficient, e is the electronic charge, h is the Planck constant, and c is the velocity of light.

The signal $\Delta I$ which represents, to within factor $1/(UI(U))$, a direct Hilbert transform of $S(f)$ is applied to the input 10 of the unit 9 for applying an inverse integral Hilbert transform to the electric signal measured as a function of a direct integral Hilbert transform parameter and is sensed by the unit 9 as a function of the direct integral Hilbert transform parameter. The electric signal proportional to the value of the above parameter is applied to the input 11 of the unit 9 from the output of the control unit 5.

After the above parameter has been scanned in the entire range of interest, the unit 9 applies an inverse integral Hilbert transform to the electric signal measured as a function of that parameter. The result, which represents the desired spectral distribution $S(f)$ of the intensity of the radiation 1, is registered at the output of the unit 9. The particular form of the electric signal to which the inverse integral HIlbert transform is applied depends on what is used as the direct integral Hilbert parameter.

The resolution of the spectrometer during measurement by the proposed method is determined by the width of the Josephson generation line in the receiver 3. This width, hence the resolution, depends both on the level of intrinsic voltage fluctuations (intrinsic line width) across the receiver 3 and on the level of the voltage induced thereacross. Therefore, to provide for the required resolution, use is made of a receiver 3 whose resistance R [ohms] and operating temperature T [K] meet condition $$RT < 740 \Delta f. \quad (8)$$

At the same time, the stability of the voltage across the receiver 3 is maintained better than 0.03 Δf [mV]. The resolution also depends on the exactness of the voltage U across the receiver 3. In addition, this exactness determines the accuracy of measuring the absolute value of the frequency in the covered spectrum. This is why the exactness of the voltage U must be as good as its stability.

Consider now the operation of the spectrometer of millimeter and far-infrared ranges in the case where the direct integral Hilbert transform parameter is the voltage U applied to the input 4 (FIG. 2) of the electromagnetic radiation receiver 3 from the adjustable voltage source performing the function of the unit 5, in measuring the instrumental function of a grating monochromator using the heat radiated by a mercury arc lamp (not shown).

As can be inferred from formula (7), in this case, the direct Hilbert transform from the spectral distribution S(f) of the radiation 1 represents function g(U) shown in FIG. 6a wherein plotted on the abscissa is U [mV] and plotted on the ordinate is g(U) in arbitrary units (see Equation (5) above), equal to $$g(U) \sim \Delta I(U) \cdot I(u) \cdot U \cdot \qquad (9)$$

The function g(U) is determined experimentally with the aid of the multiplier unit 12 (FIG. 2) whose input 14 receives from the source 5 electric signals proportional to the current through the receiver 3 and to the voltage U thereacross, while present at the input 13 is an electric signal proportional to ΔI applied from the output of the synchronous detection unit 6. Application of an electric signal proportional to g(U) to the input 10 and an electric signal proportional to U to the input 11 of the unit 9 gives at its output, hence at the output of the spectrometer, the desired spectral distribution S(f) (shown in FIG. 6b where plotted on the abscissa is f [cm$^{-1}$] and plotted on the ordinate is S(f) in arbitrary units) in the form of an inverse Hilbert transform according to formula (to within factor $|K(f)|^2$, c.f. Equation (6) above).

$$S(f) \sim \frac{1}{\pi} \int_{-\infty}^{+\infty} \frac{g(U)dU}{U - 0.062f} \cdot \qquad (10)$$

Because of the function g(U) being odd, the integral in formula (10) is transformed so that the integration is done only with respect to the range of values of U from zero to $+\infty$ which permits measuring the function g(U) only for positive values of U. However, to determine S(f) from formula (10), it is necessary to measure the function g(U) at all values of U whereat it is other than zero.

According to formula (7), the maximum value of the voltage U after which (to within measurement noise) the function g(U) may be considered equal to zero will always exist if the spectral distribution S(f) is other than zero only in the range of frequencies lower than the maximum frequency $f_1$ in the spectrum of interest. If the voltage U increases in the range of values exceeding $0.062f_1$ [mV], as can be seen from formulas (1) and (3), the function g(U) will increase with U but not more slowly than 1/U, hence, at certain sufficiently high values, U will definitely become lower than the measurement noise.

In the case where the internal impedance of the adjustable voltage source 5 (FIG. 3) is much greater than the impedance of the receiver 3, the resistance of the latter varying under the effect of the modulated radiation will result in an electric signal at the output of the receiver 3, varying directly with ΔU of the voltage across the receiver 3. In order to derive from ΔU the variation ΔI in the current through the receiver 3, which forms part of formulas (7) and (9), one must measure the differential resistance R of the receiver 3 as a function of the voltage U use the known formula $$\Delta I = -\Delta U/R. \qquad (11)$$

R is measured by a known method with the aid of the low-frequency generator 15 producing a signal which is applied to the input 4 of the receiver 3 and by means of the phase-sensitive detection unit 16 which detects the a.c. voltage applied to its input 17 from the output of the receiver 3, having the same frequency as the generator 15 to which the unit 16 is tuned. The input 18 of the unit 16 receives a reference signal from the generator 15. To eliminate the influence of the a.c. signals at the output of the receiver 3, produced by the modulated radiation and the generator 15, the frequency of modulation of the radiation 1, which is determined by the modulator 2, and the generation frequency of the generator 15 must be spread apart to a greater extent than the bandwidth of each one of the units 6 and 16, which can be easily done by taking the modulation frequency equal to, for example, 400 Hz and the generation frequency equal to 1 KHz. It is also necessary to ensure that the variable voltage generated by the generator 15 across the receiver 3 does not impair the resolution of the spectrometer, which means that this voltage must also be lower than 0.03 f [mV]. The above-described embodiment of the spectrometer of millimeter and far-infrared ranges is most suitable for incorporation of receivers 3 with a low resistance R, which is required to ensure high resolution.

In the case where the direct integral Hilbert transform parameter is chosen to be the center frequency $f_2$ of an adjustable narrow spectral emission or absorption band, the center frequency $f_2$ must be adjusted by means of the scanning unit 24 (FIG. 4) in accordance with the signals applied to its input 25 from the unit 5. At the same time, the unit 5 applies signals varying directly with the center frequency $f_2$ to the input 11 of the unit 9. In such a measurement procedure, the electric signal at the output of the receiver 3, varying directly with ΔI, is expressed by the following formula:

$$\Delta I(U_0, f_2) \sim \left(-\frac{1}{\pi}\right) \int_{-\infty}^{+\infty} \frac{S(f - f_2)df}{0.062f - U_0}, \qquad (12)$$

in deriving which from formula (7) it was assumed that the width δ of the band of interest and the center frequency $f_2$ are related as follows:

$$\delta/f_2 << 1, \qquad (13)$$

and that the dependence of the function $|K(f)|^2$ on f in the $f_2$ adjustment range can be ignored because this range is sufficiently narrow. The spectral distribution S(f) being written in formula (6) as $S(f-f_2)$ is due to the fact that as $f_2$ varies, the band is shifted over the spectrum without its shape and intensity being affected. In such measurements, the voltage U across the receiver 3 is set equal to $$U_0 = 0.062f_3[mV], \qquad (14)$$

where $f_3$ is the midpoint of that frequency range (always limited) in which the band of interest may be adjusted with due account for the imposed conditions.

Formula (12) suggests that the measured function ΔI ($f_2$) represents a direct Hilbert transform from the spectral distribution $S(f-f_2)$. Hence, the inverse integral Hilbert transform applied by the unit 9 to the measured relationship $\Delta I(f_2)$ received by the inputs 10 and 11 of the unit 9 gives, at the output of the latter, the desired spectral distribution of electromagnetic radiation intensity within the band of interest, according to formula $$S(f - f_3) \sim \frac{1}{\pi} \int_{-\infty}^{+\infty} \frac{I(U_0, f_2) df_2}{f_2 - (f - f_3)}. \tag{15}$$

In the case where measurement is made of the shape of the adjusted narrow spectral emission band produced by the source 22, the value of the center frequency $f_2$ is set by the scanning unit 24 following commands from the control unit 5.

The measured relationship $\Delta I(U_o, f)$ shown in FIG. 7a, where plotted on the abscissa is $f$ [cm$^{-1}$] and plotted on the ordinate is $\Delta I(U_o, f_2)$ in arbitrary units, is applied to the inputs 10 and 11 of the unit 9 wherefrom the desired spectral distribution $S(f-f_3)$ is derived, shown in FIG. 7b, where plotted on the abscissa is $f-f_3$ [cm$^{-1}$] and plotted on the ordinate is $S(f-f_3)$ in arbitrary units.

In investigation of narrow spectral absorption bands, an absorption band appears in the spectrum of the radiation 1 incident upon the modulator 2 after having passed from the source 26 (FIG. 5) through the absorption cell 27. In the case where this band is sufficiently narrow to enable to think that in its vicinity the spectral distribution $S_o(f)$ of the broad-band radiation is independent of the frequency $f$, presentation of the spectral distribution $S(f)$ of the intensity of the radiation 1 as $S(f) = S_o(f) - S_1(f)$ and substitution of this expression into formula (1) give $$I(U_0, f_2) \sim \frac{1}{\pi} \int_{-\infty}^{+\infty} \frac{S_1(f - f_2) df}{0.062f - U_0}, \tag{16}$$

wherein $S_1(f)$ is the spectral density of the absorption band under investigation.

In this case, the center frequency $f_2$ is scanned by applying a magnetic (or electric) field to the absorption cell 27, the magnitude of this field being set by the unit 24 following commands from the unit 5. Application of the measured relationship $\Delta I(U_o f_2)$ to the input of the unit 9 gives, at its output, the desired spectrum of the absorption band under investigation, in accordance with a formula similar to formula (15).

The present invention permits spectral measurements with an extremely high (up to $10^{-14}$ W/Hz$^{\frac{1}{2}}$) sensitivity.

The invention also permits simplifying the measurement procedure, reducing the size, weight and power requirement of spectrometers, simplifying their design and making them less expensive.

What is claimed is:

1. A method for measuring the spectral distribution of electromagnetic radiation, comprising the following steps:
converting the spectral distribution of electromagnetic radiation to an electric signal by means of a direct integral Hilbert transform in superconducting weak links, by making use of an a.c. Josephson effect in said superconducting weak links, wherein the instrinsic Josephson generation line width is less than the value corresponding to the required resolution,
measuring the electric signal as a function of a direct integral Hilbert transform parameter; and
applying an inverse integral Hilbert transform to the measured function to determine the desired spectral distribution of said electromagnetic radiation.

2. A method as claimed in claim 1, wherein said direction integral Hilbert transform parameter is the voltage across said superconducting weak links, comprising the additional step of varying said voltage from zero to a value exceeding $0.062f_1$ [mV], where $f_1$ [cm$^{-1}$] is the maximum frequency in the spectrum under investigation.

3. A method as claimed in claim 2, wherein said radiation occupies a narrow band within a limited frequency range said direct integral Hilbert transform parameter is the center frequency of said band the voltage across said superconducting weak links being constant and corresponding to the midpoint of said limited frequency range.

4. A spectrometer of millimetric and far-infrared ranges for measuring the spectral distribution of electromagnetic radiation, comprising:
an electromagnetic radiation modulator disposed in the path of said electromagnetic radiation and having an input, a first output and a second output, said input receiving the electromagnetic radiation to be investigated;
an electromagnetic radiation receiver comprising superconducting weak links, for conversion of the spectral distribution of electromagnetic radiation to an electric signal by means of a direct integral Hilbert transform, the resistance R [ohms] and operating temperature T [K] of said links selected to meet the condition RT $<740 f_1$, where $f_1$ [cm$^{-1}$] is the required spectral resolution, said receiver having a first input, a second input and an output, said first input being optically coupled to said first output of said electromagnetic radiation modulator;
a phase-sensitive detection unit having a first input, a second input and an output, said first input being connected to said second output of said electromagnetic radiation modulator and said second input being connected to said output of said electromagnetic radiation receiver;
a processing unit for subjecting the electric signal measured as a function of a direct integral Hilbert transform parameter to an inverse integeral Hilbert transform, said processing unit having a first input, a second input and an output which serves as the output of the spectrometer, said first input being connected to said output of said phase-sensitive detection unit;
a control unit having a first output and a second output, said first output being connected to said second input of said electromagnetic radiation receiver and said second output being connected to said second input of said processing unit.

5. A spectrometer as claimed in claim 4, wherein said direct integral Hilbert transform parameter is the voltage across said superconducting weak links, further comprising means for varying said voltage from zero to a value exceeding $0.062f_1$ [mV], where $f_1$ [cm$^{-1}$] is the maximum frequency in the spectrum under investigation, so that the electric signal-to-noise ratio diminishes to unity,
a multiplier unit having a first input, a second input and an output, said first input being connected to said output of said phase-sensitive detection unit and said output being connected to said first input of said processing unit
said control unit comprising an adjustable voltage source and having a third output connected to said second input of said multiplier unit.

6. A spectrometer as claimed in claim 4, wherein said radiation occupies a narrow band within a limited frequency range, said direct integral Hilbert transform parameter is the center frequency of said band, further comprising means for scanning said band from low to high frequencies, and means for setting the voltage across said superconducting weak links at a constant value equal to 0.062f [mV], where f [cm$^{-1}$] is the midpoint of said limited frequency range, including:
a center frequency scanning unit having an input and an output, said input being connected to said control unit;
a source of the electromagnetic radiation to be investigated, having an input and an output, said input being connected to said output of said center frequency scanning unit and said output being connected to said input of said electromagnetic radiation modulator.

7. A spectrometer as claimed in claim 6, wherein said source of the electromagnetic radiation to be investigated is essentially a source of narrow-band variable frequency electromagnetic radiation.

8. A spectrometer as claimed in claim 6, wherein said source of the electromagnetic radiation to be investigated comprises:
a source of broad-band electromagnetic radiation, having an output; and
an absorption call having an absorption frequency range within a narrow spectral absorption band to be investigated, said cell having a first input, a second input and an output and arranged between said electromagnetic radiation modulator and said source of electromagnetic radiation, said first input being connected to said output of said source of broad-band electromagnetic radiation, said second input being connected to said output of said center frequency scanning unit, and said output being connected to said input of said electromagnetic radiation modulator.

9. A spectrometer for determining the frequency spectrum of microwave or infrared radiation signals, comprising:
means for modulating the radiation to be measured;
a frequency scannable receiver for receiving the output of said modulating means;
a control unit for applying a variable scanning voltage to said receiver, the value of said scanning voltage being proportional to a Hilbert transform parameter;
a phase detector having an input coupled to the output of said receiver;
means for coupling a reference signal from said modulator to said phase detector, whereby the output of the phase detector is a direct Hilbert transform of the spectral distribution of said radiation signals when said scanning voltage is scanned through the entire frequency range of said signals;
means coupled to the output of said phase detector for obtaining the spectral distribution of said radiation signals by deriving the inverse integral Hilbert transform of said phase detector output.

* * * * *